United States Patent [19]

Blatt

[11] 3,742,774
[45] July 3, 1973

[54] ADJUSTABLE STROKE RETRACTOR MECHANISM

[76] Inventor: Leland F. Blatt, 24121 Mound Road, Grosse Pointe Woods, Mich. 48091

[22] Filed: Apr. 5, 1971

[21] Appl. No.: 131,335

[52] U.S. Cl.............................. 74/89.15, 308/3 A
[51] Int. Cl............................................. F16h 27/02
[58] Field of Search....................... 74/89.15, 424.8; 308/3 A

[56] References Cited
UNITED STATES PATENTS
1,590,570 6/1926 Flack et al......................... 74/89.15
2,367,957 1/1945 Metcalfe............................ 308/3 A
3,554,046 5/1969 Kirk.................................... 74/424.8

FOREIGN PATENTS OR APPLICATIONS
895,878 8/1959 Great Britain..................... 74/424.8

Primary Examiner—Charles J. Myhre
Assistant Examiner—Wesley S. Ratliff, Jr.
Attorney—Cullen, Settle, Sloman & Cantor

[57] ABSTRACT

A retractor mechanism for an article handling apparatus is comprised of a longitudinal track assembly which supports a shuttle unit for reciprocating movement along the track externally thereof; the stroke of the shuttle unit is adjustable by means of a longitudinally displacable shock absorber assembly at one end of the track which is adapted to stop the travel of the shuttle unit and absorb the kinetic energy of the latter; the shock absorber assembly is adjustable by means externally of the track including a screw supported within the track at both ends for rotation and which carries an internally threaded member which supports the shock absorber assembly; upon rotation of the screw within the track the shock absorber support will be moved along the screw taking the shock absorber with it in a direction towards the shuttle unit to thereby limit the travel of the shuttle unit.

4 Claims, 6 Drawing Figures

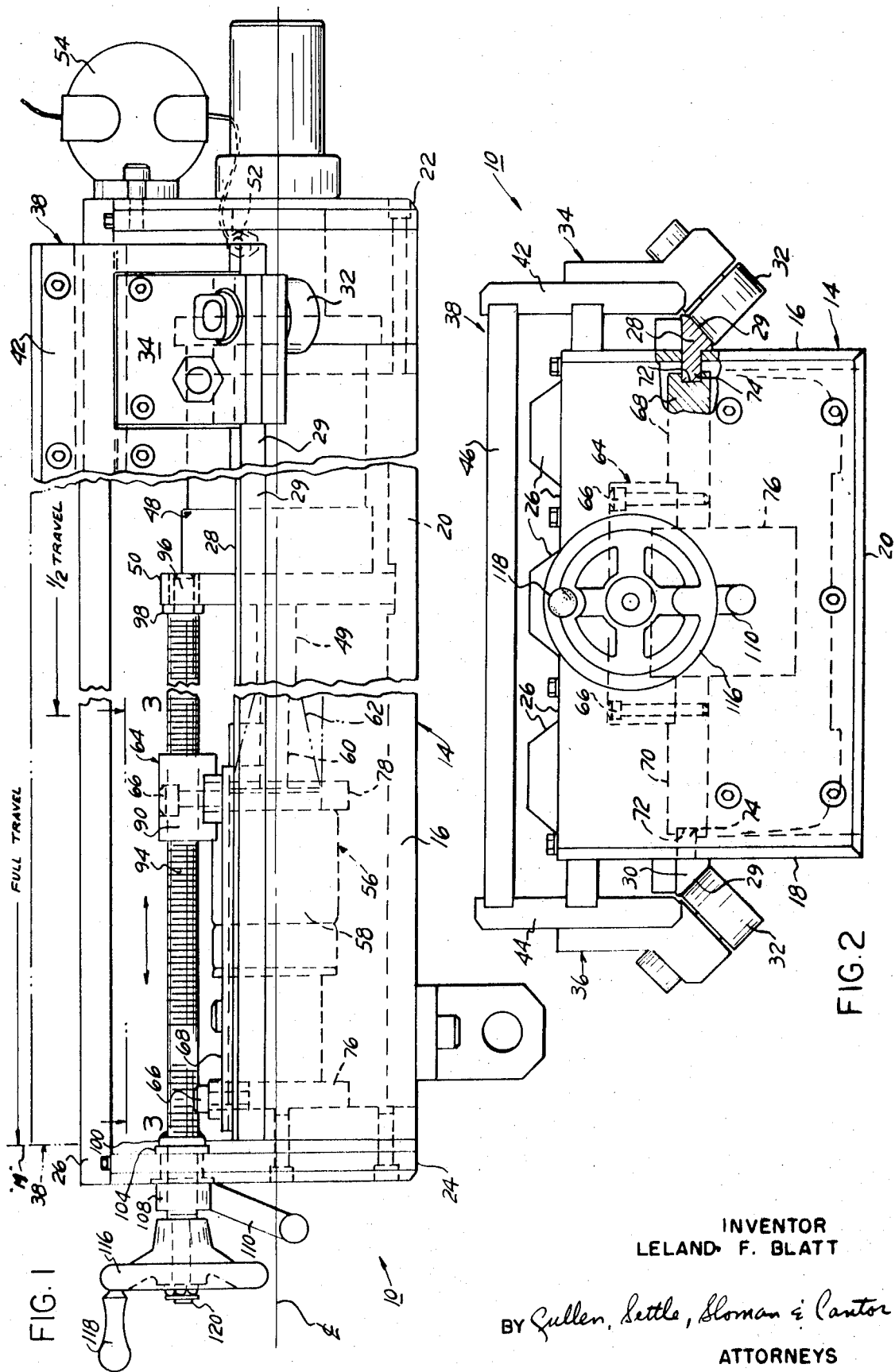

INVENTOR
LELAND F. BLATT
BY Cullen, Settle, Sloman & Cantor
ATTORNEYS

ADJUSTABLE STROKE RETRACTOR MECHANISM

REFERENCE TO RELATED APPLICATIONS

The present invention is in part related to applicant's prior U.S. Pat. No. 2,971,389, filed July 21, 1958 and co-pending application Ser. No. 49,862, filed June 25, 1970, now U.S. Pat. No. 3,665,771.

BACKGROUND OF THE INVENTION

The present invention relates to retractor mechanisms for load handling apparatuses and more in particular to a retractor mechanism having a reciprocable shuttle unit operable for reciprocation by means of a fluid cylinder having a predetermined maximum stroke dimension.

In applicant's co-pending application, a longitudinal track is provided which carries a reciprocable shuttle unit for travel therealong, back and forth. The shuttle unit is powered by a fluid cylinder which has a piston rod attached to a cross-head of the shuttle unit along the center line of travel. At the rear end of the retractor mechanism, a shock absorber assembly is provided in the form of combination spring buffer and fluid cushion disposed along the center line of travel of the unit. The shock absorber assembly is provided to absorb and cushion the kinetic energy of the shuttle unit at the end of the stroke, prior to reversal of travel of the shuttle unit.

In the above known structure, the shock absorber assembly is mounted stationarily within and at the end of the track of the retractor mechanism and is thus only adaptable for constant stroke applications.

In many instances related to parts handling applications, it is often desirable or required to vary the effective stroke of the retractor mechanism, that is, to limit the length of travel of the shuttle unit to less than the maximum designed travel of the mechanism. Although this can be accomplished easily by provision of appropriate fluid pressure control means to interrupt fluid pressure of the fluid cylinder at any time during travel of the shuttle unit along the longitudinal track to stop further travel of the unit at a designated location, there are no means provided at that location to cushion and absorb the kinetic energy of the shuttle unit, which has a tendency-due to inertia-to continue travel in the same direction after interruption of fluid power. This tendency obviously introduces considerable undesirable shock loads to the mechanism in addition to high stresses imparted on the actuator.

Accordingly, the primary object of the present invention is the provision of a longitudinally adjustable shock absorber mounting assembly for a retractor mechanism of a load handling apparatus, which is adjustable along the center line of travel of the shuttle unit of the retractor mechanism to cushion and absorb the kinetic energy of the shuttle unit at a selected point of stoppage of the shuttle unit between a minimum and maximum length of travel.

It is also an object of the present invention to provide an adjustable stroke retractor mechanism in which a load carrying shuttle unit of the retractor mechanism is adjustable between half and full length of travel and in which, in conjunction therewith, an adjustable shock absorber assembly is provided to cushion the impact and absorb the kinetic energy of the shuttle unit at selected points of stoppage.

In summary, the shock absorber assembly of the present invention, is mounted on a slide, which is longitudinally movable along the retractor track by means of a screw and nut mechanism in which the screw is longitudinally stationary and the nut is an integral part of the slidable shock absorber mount. The screw is provided with a handle for rotation so that, when the screw is rotated, the shock absorber assembly will be moved longitudinally due to its connection to the slide assembly.

The present invention will be best understood by reference to the following detailed description of a preferred embodiment of the invention in conjunction with the attached drawings.

BRIEF DESCRIPTION OF THE DRAWINGS

The figures in the accompanying drawing illustrate a preferred embodiment of the invention in which:

FIG. 1 is a side elevation of a retractor mechanism longitudinally broken off at several locations to permit a clear illustration of the complete unit within a single figure, the present invention being incorporated at the left or rear end of the mechanism;

FIG. 2 is a left hand end view of the retractor mechanism of FIG. 1;

DETAILED DESCRIPTION OF THE INVENTION

Figure 3:
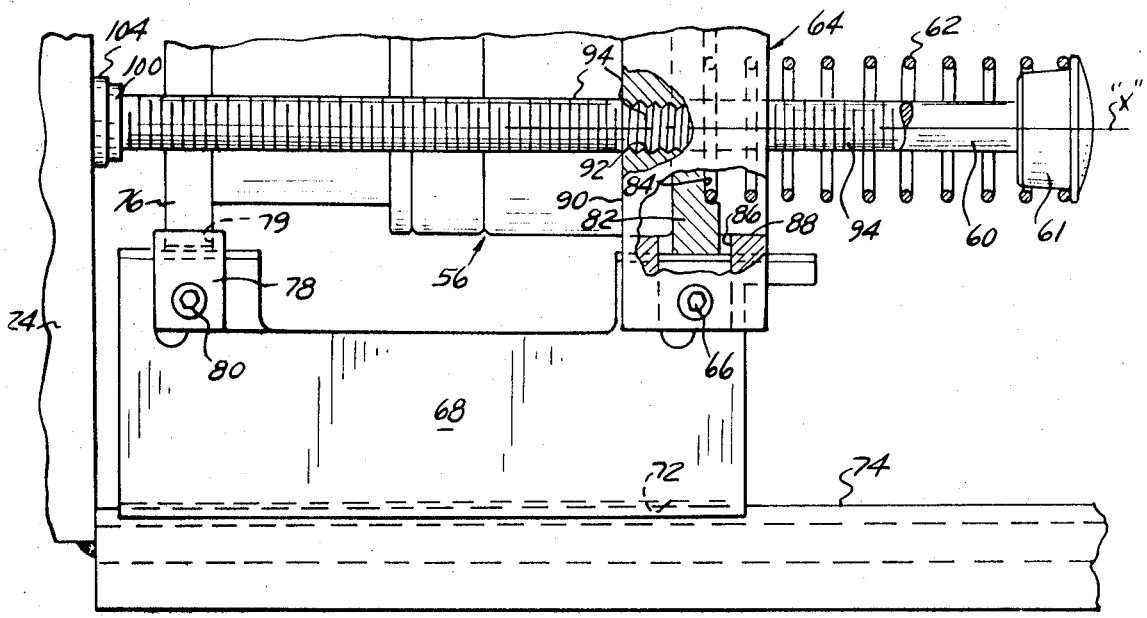
FIG. 3 is a fragmentary enlarged top plan view of the screw and shock absorber mounting connection as seen in the direction of arrows 3—3 in FIG. 1 and with portions shown in cross-section for clarity.

With continuing reference to the drawings, particularly FIGS. 1 to 4, the retractor mechanism 10 is comprised of a longitudinal supporting frame or track 14 comprised of opposed longitudinal side walls 16 and 18 and closed bottom wall 20. The opposite ends of the longitudinal track 14 are closed by respective front end cover assembly 22 and rear end cover assembly 24. The rear and front end cover assemblies 22–24 are connected across the entire length of the track 14 by means of a cover plate 26 to prevent debris and other contaminants to fall into the trough shaped track 14.

Normally, the track 14 of the retractor mechanism 10 is supported on a cross-rail or the like (not shown) as more fully disclosed in applicant's co-pending application, Ser. No. 49,862, now U.S. Pat. No. 3,665,771, and which forms no part of the present invention.

The upper edges of parallel opposed side walls 16 and 18 of track 14 are formed in outwardly extending, longitudinal raceways 28 and 30 respectively, which, in this instance, have lower, inwardly and oppositely inclined bearing surfaces 29 for engagement by roller means 32 of a pair of opposite disposed carriage assemblies 34 and 36 respectively, which are disposed along the side walls 16 and 18 of track 14. The carriage assemblies 34 and 36 are connected together to form an integral shuttle unit 38 by means of side support plates 44 and 42, which are connected across the track 14 by a transverse support plate 46, as seen in FIG. 2.

It will be noted that the shuttle unit 38 in the present application is disposed for reciprocating movement along the top of the track 14 of the retractor mechanism, which is shown in inverted position relative to the mechanism disclosed in applicant's prior application Ser. No. 49,862 now U.S. Pat. No. 3,665,771, in which the shuttle unit is mounted on the housing for movement along the bottom of the track 14. Similarly, the track 14 is shown in inverted, that is, upside down position, relative to the disclosure in the co-pending application. However, either positioning of the retractor mechanism, rightside up or inverted, is immaterial to the present invention and is depending primarily on the installation requirement of any particular application. The present invention is similarly applicable to a downwardly suspended shuttle and retractor mechanism as disclosed in the afore mentioned co-pending application.

As will be understood, the transverse top plate 46 of the shuttle unit 38 is adapted to support a load handling device, such as a gripper head or the like (not shown). The shuttle unit 38 is adapted for longitudinal reciprocable movement along the top of the track 14 by rolling engagement of the rollers 32 along the raceways 28 and 30. Shuttle unit 38 may be supported longitudinally along the track by means of a stroke multiplying gear and rack mechanism (not shown), such, as more in detail disclosed in co-pending application Ser. No. 49,862 now U.S. Pat. No. 3,665,771,. The particular structure of this drive arrangement does not form a part of the present invention and is immaterial thereto and thus, needs no further description.

The shuttle unit 38 is actuated for movement by means of a fluid cylinder 48 longitudinally disposed within the track 14 between the opposed side walls 16 and 18. The fluid cylinder 48 is supported at one end by the front end cover assembly 22 and inwardly of the track 14 on stationary bulk head 50. The fluid cylinder 48 is supplied with fluid under pressure by means of an inlet 52 through front end cover assembly 22 which is in fluid communication with a fluid pressure reservoir or tank 54.

As will be understood by reference to co-pending application Ser. No. 49,862 now U.S. Pat. No. 3,665,771, and as will not be shown or described herein in any greater detail for the sake of clarity, the piston rod 49 of fluid cylinder 48 is operably connected to a crosshead or similar bracing member within the track 14 which in turn is operably connected by means of the internal gear and rack drive mechanism (not shown) forming part of the shuttle unit 38 as previously described. Thus, upon application of fluid pressure of the fluid cylinder 48 through inlet 52, the shuttle unit 38 will be moved from the front end of the longitudinal track 14 (right hand in the drawing) towards the rear end of the track (left hand in the drawing) as indicated at "M" for maximum travel, and subsequent return to the front end of track 14 as will be understood.

The rear end of longitudinal track 14 (left side in the drawing) is provided with a shock absorber assembly 56 which may be of a construction similar to that disclosed in applicant's co-pending application and which comprises a fluid cushion. cylinder 58 from which extends a piston rod 60 normally biased outwardly of fluid cushion cylinder 58 by means of a spring 62.

As more in detail shown in applicant's co-pending application and in FIG. 3, the outer end of the piston rod 60 of the shock absorber assembly 56 has an enlarged head portion 61 forming a bumper for respective abutment against the cross-head of the shuttle unit 38 to which the piston rod 49 of power fluid cylinder 48 is attached, as previously described. The particular structure of the shock absorber assembly 56 is of no importance and depends mainly on the particular design and application requirement. The shock absorber assembly 56 is adapted to cushion the impact of the shuttle unit 38 at the end of the forward stroke prior to reversal of movement and to absorb the kinetic energy of the shuttle unit.

With continuing reference to the drawings and particularly FIG. 3, the present improved adjustable mounting assembly for shock absorber mechanism 56 comprises a transverse front end shock mounting member 64 which is disposed in horizontal direction across front end of the shock absorber 56. As seen in FIG. 3, the mounting member 64 is attached at both ends by means of fasteners 66 to a pair of opposite outwardly, that is, towards the side walls 16 and 18 extending slide members 68 and 70 respectively. The lateral outer surfaces of each of the slide members 68 and 70 are longitudinally slotted as at 72 (FIG. 2). The longitudinal lateral slots 72 are adapted to engage longitudinal slide ways 74 which are inwardly directed continuations of the outer longitudinal raceways 28 and 30 for the shuttle unit 38.

It will be understood, that the engaging bearing surfaces between the longitudinal slots 72 and the opposite longitudinal slide ways 74 are provided with layers of friction reducing material or are sufficiently lubricated to permit substantially frictionless sliding movement of the opposite slide members 68 and 70.

With particular additional reference to FIG. 3, the rear end of the shock absorber assembly 56 is provided with a mounting plate 76 which may be square in plan view. Mounting plate 76 is mounted to be retained by a pair of identical bracket members 78, only one of which is shown in FIG. 3 , it being understood that a similar bracket member is provided at the opposite side of the center line "X" of the shock absorber. Although only one half of the plan view in FIG. 3 is shown, it should be understood that the arrangement is symmetrical on both sides of the centerline "X" of the shock absorber.

Bracket member 78 is slotted at 79 to receive an edge portion of the mounting plate 76 of shock absorber assembly 56 and is bolted to the rear end of slide member 68 (slide member 70, respectively, at the other side of center line "X") by means of fastener 80.

The front end of shock absorber assembly 56 is similarly provided with a mounting plate 82 of identical shape. Front end mounting plate 82 is provided with a central planar recess 84 adapted to retain one end of the shock absorber spring 62. The one piece mounting member 64 extends across the top of the front end of shock absorber assembly 56 and is provided with a transverse slot 86 to receive the top edge of shock absorber mounting plate 82. As shown, the sides of shock absorber mounting plates 76 and 82 are retained against the inner sides of the respective slide members 68 and 70.

Mounting member 64 at the front end of shock absorber assembly 56 is further provided with a longitudinal recess 88 which intersects the transverse slot 86 and which is adapted to fit mounting member 64 over the front end of shock absorber assembly 56. As previously described, mounting member 64 is similarly attached at both ends to opposite slide members 68–70 by means of fasteners 66.

Mounting member 64 has an intermediate bridge portion 90 provided with an axial threaded through bore 92. Threaded through bore 92 of mounting member 64 is adapted to receive a threaded rod 94 in threading engagement therewith. Threaded rod 94 extends longitudinally within the frame 14 along the top of shock absorber assembly 56 and in co-planar vertical alignment with center line "X" thereof. The inner end of threaded rod 94 is provided with a threadless, reduced diameter pilot portion 96 adapted for rotation within a bushing 98 disposed within an appropriate aperture provided in the top end of the stationary bulk head 50 which mounts the cylinder 48. Thus, threaded rod 94 is longitudinally stationarily rotatable at the inner end within bushing 98.

Figure 4:
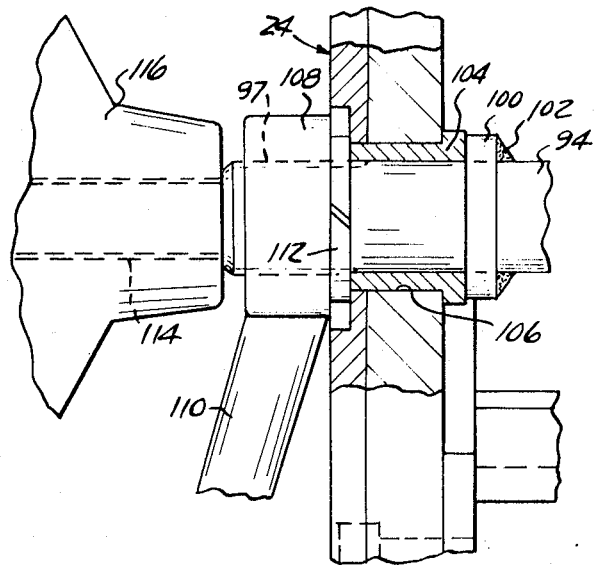
FIG. 4 is an enlarged fragmentary partial cross-section through the screw supporting means at the actuating end.

With further reference to FIG. 4, in addition to FIG. 1, the outer end of threaded rod 94 adjacent the inside of rear cover assembly 24 is provided with a radial flange 100 which is welded thereto as at 102. The flange 100 abuts against the outer enlarged head portion of a similar hardened, wear resistant bushing 104 disposed within an aperture 106 provided in the rear end cover assembly 24. The portion of rod 94 within bushing 104 is threadless for rotation within the bushing. Outside of bushing 104, rod 94 is again provided with a short section of threads 97 adapted to receive a lock nut 108 provided with a lever 110 adjacent the outer surface of rear end cover assembly 24. A lock washer 112 is disposed around threaded portion 97 of rod 94 between the inner end of lock nut 108 and the outer end of bushing 104 and the surface of cover assembly 24. Thus, open tightening of lock nut 97 by means of lever 110, rod 94 is drawn slightly outwardly for clamping engagement of flange 100 against the head portion of bushing 104 to securely retain rod 94 against inadvertent rotation. Normally, as will be seen from FIG. 1, threaded rod 94 is retained against any axial longitudinal movement in either direction by means of the outer end flange 100 abutting against bushing 104 and the shoulder of pilot portion 96 at the inner end abutting against bushing 98. The extreme outer end of rod 94, beyond the threaded outer portion 97, is of reduced diameter and is provided with splines of serrations 114 adapted to receive the hub of an adjusting wheel 116 which is provided with a handle 118 and is locked onto the splined end of rod 94 by means of lock nut assembly 120.

In operation, and referring to FIG. 1, the carriage 38 normally is designed for travel along frame 14 from the extreme right to the extreme left in FIG. 1, a distance indicated by the notation "full travel." In accordance with the present invention, the full travel of carriage 38 can be limited between "M" maximum and the point indicated by the notation "one-half travel." This requires that shock absorber 56 must be longitudinally adjusted within frame 14 in order to absorb the kinetic energy of carriage 38 at any position between half and full travel.

To this effect, lock nut 108 is released by turning lever 110 counter clockwise. Thereafter, the threaded rod 94 can be rotated within its outer and inner bushings 104 and 98 by rotation of hand wheel 116. Since rod 94 is axially stationarily retained, rotation of threaded rod 94 causes mounting member 64 to be shifted along rod 94, which is to the right in FIG. 1. Due to engagement of mounting member 64 with mounting flange 78 and attachment to slide members 68–70, and engagement of brackets 78 with the other mounting flange 76 of shock absorber assembly 56, shock absorber assembly 56 will be taken along by movement of mounting member 64 supported by slide members 68 and 70 along opposite rails 74, to the desired position longitudinally inwardly of frame 14. After desired adjustment, lock nut 108 at the outer end of rod 94 is tightened by rotation of lever 110 in clockwise direction.

Figure 5:
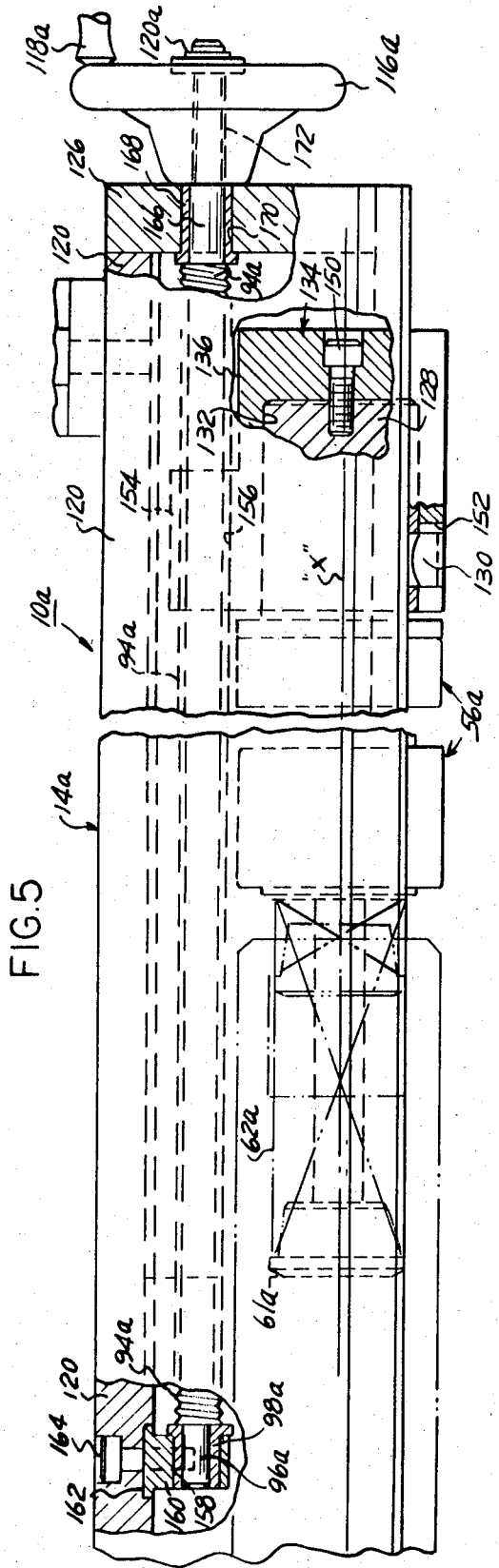
FIG. 5 is a longitudinal side view of a modified embodiment of the present invention with portions thereof broken away and shown in cross section for clarity.
Figure 6:
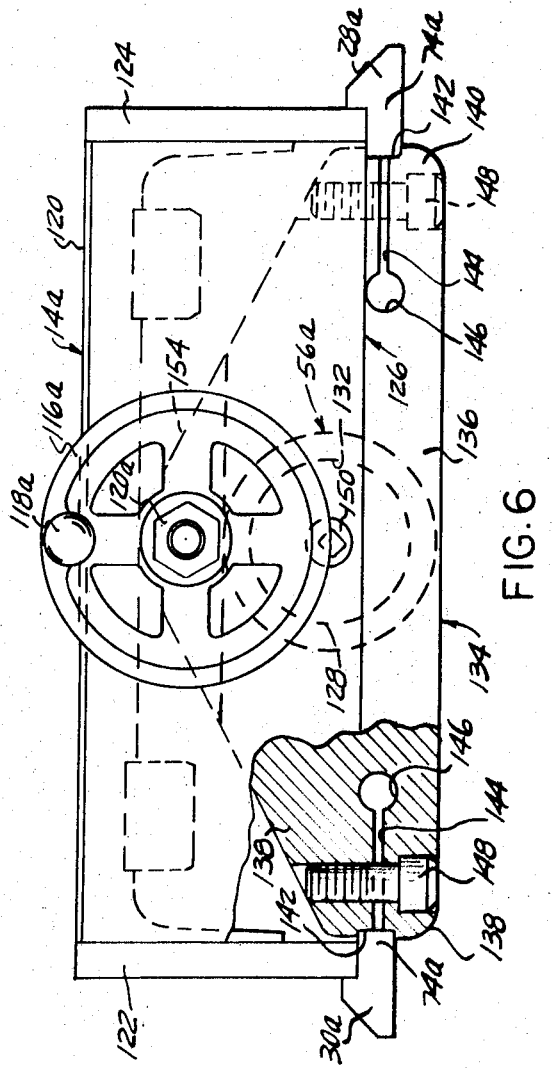
FIG. 6 is a right hand side view of the embodiment in FIG. 5, partly shown in cross section.

Referring now to FIGS. 5 and 6, there is illustrated a preferred embodiment of the present invention embodied in a similar load handling retractor mechanism generally indicated at 10a which is comprised of an inverted downwardly open housing or supporting track frame 14a. The housing or track frame 14a comprises a closed cover 120 from which opposite marginal edges depend side plates 122 and 124. The rear end of track frame 14a (at the right in FIG. 5) is closed by an end cover 126 suitably secured by conventional fastener means, welding or the like to cover plate 120 and both side plates 122 and 124.

In the embodiment of FIGS. 5 and 6, the end of shock absorber assembly 56a comprises a fluid cylinder 128 provided with an inlet fitting 130. Cylinder 128 is supported within an axial cylindrical recess 132 provided centrally within a transverse oriented mounting bracket 134. Mounting bracket 134, as more clearly seen in FIG. 6, extends transverse of track frame 14a below cover plate 120 and inwardly of rear end cover 126. Mounting bracket 134, which is substantially triangular in plan view as seen in FIG. 6, has a rear wing like portion 136 whose opposite ends 138 and 140 extend outwardly towards the opposite side walls 122 and 124.

As shown in FIG. 6, each of the lateral sides of the opposite ends 138 and 140 of portion 136 is provided with a lateral slot or groove 142 by which mounting bracket 134 is axially slidably supported on internal rail extensions 74a integral with opposite raceways 28a and 30a respectively, in a similar fashion as shown in FIG. 2 of the previously described embodiment. As described previously and shown in FIG. 2, external longitudinal raceways 28a and 30a are adapted to slidably support a material handling shuttle unit 38 for reciprocable movement along track frame 14a, as will be understood from the previous description.

The winged outer ends of mounting bracket 134 are suitably provided with inwardly extending slots 144 which extend a substantial distance inwardly. Both slots 144 culminate at the inner end in widened portions 146 of generally cylindrical configuration. Slots 144 are located essentially along the center of opposed longitudinal slide grooves 142 and intersect the grooves at their outer end. Thus, the winged outer end portions 138 and 140 of mounting bracket 134 are longitudinally split by means of slots 144, providing a degree of resilient flexibility to permit clamping of the mounting bracket 134 to the rail extensions by means of tightening socket head screws 148 which extend across slots 144 from the bottom of mounting bracket 134.

As more clearly seen in FIG. 5, the end of cylindrical portion 128 of shock absorber assembly 56a is axially adjustably supported in cylindrical recess 132 of mounting bracket 134 by means of an adjusting screw 150 disposed in axially aligned position relative to center line "X" of the shock absorber assembly. Thus, the shock absorber assembly 56a can be independently axially adjusted relative to mounting bracket 134 a limited distance as provided for by the length of adjusting screw 150. In order to not interfere with the fixed position of inlet fitting 130 provided at the cylindrical portion of shock absorber assembly 56a, the lower inner portion of mounting bracket 134 is provided with a longitudinal recess 152 through which fitting 130 extends. Thus, axial adjustment of shock absorber assembly 56a can be made without interferring with the fixed position of inlet fitting 130. Axial adjustment of shock absorber assembly 56a within a predetermined limit is desirable and necessary to adjust the expansion force of shock absorber spring 62a to compensate for normal fatigue of the spring.

With continuing reference to FIG. 5, the inner portion of mounting bracket 134 is upwardly extended providing a triangular shaped flange portion 154 (FIG. 6). Upwardly extending flange 154 is provided with an axially threaded bore 156 extending in a direction parallel to axis "X" of shock absorber assembly 56a. Threaded bore 156 of flange extension 154 is adapted to threadably receive the screw rod 94a which extends in longitudinal parallel direction above shock absorber assembly 56a and above the winged rear portion 136 of mounting bracket 134. The end of screw rod 94a, slightly in front of extended buffer 61a of shock absorber assembly 56a comprises a threadless reduced diameter pilot portion 96a which is adapted to rotatably support the end of the screw rod 94a within a wear hardened bushing 98a. Bushing 98a is nonrotatably press fitted within a bore 158 of a screw support bracket 160 which is rigidly secured by means of flange 162 and fasteners 164 to the top cover plate 120 (or a portion thereof) of track frame 14a.

The outer end of screw rod 94a, as in the previous embodiment, comprises a threadless reduced diameter portion 166 to provide rotatable support within a bushing 168 nonrotatably retained in a bore 170 provided in the rear end cover 126 of track frame 14a. Screw rod 94a extends beyond the rotatable pilot support portion 166 outwardly of rear end cover 126 and is there provided with splines, serrations or the like 172 to which is secured a hand wheel 116a provided with a crank handle 118a, in a similar fashion as described in connection with the previous embodiment. Hand wheel 116a is secured against loosening from the spline or serrated outer end 172 of screw rod 94a by means of a lock assembly 120a.

In operation of the preferred embodiment disclosed in FIGS. 5 and 6, if it is desired to longitudinally move the complete shock absorber assembly 56a along the internal opposed rail extensions 74a, clamping screws 148 are loosened to permit sliding movement of the outer winged portions 138 and 140 of mounting bracket 134 along rails 74a. After loosening of clamping screws 148, hand wheel 116a can be rotated by means of crank handle 118a to rotate screw rod 94a. Due to the longitudinally stationary confinement of screw rod 94a, within inner stationary bracket 160 and stationary rear end cover 126, mounting bracket 134 is caused to longitudinally move along the rotating screw rod 94a in supported and parallel axially aligned position by engagement of slide grooves 142 with rails 74a.

As in the previous embodiment herebefore described, the bearing surfaces of opposite slide grooves 142 as well as the bearing surfaces of opposite internal rails 74a will be provided with adequate lubrication or with a coating of substantially frictionless bearing material conventionally employed in machine slide structures of this type. Longitudinal movement of mounting bracket 134 along rotating screw rod 94a causes a similar axial longitudinal movement of shock absorber assembly 56a inwardly of track frame 14a to limit the travel of load handling shuttle unit 38, which is normally mounted for reciprocation along track frame 14a to thereby absorb the kinetic energy of shuttle unit 38 at any desired stop location along track frame 14a.

The present invention may be embodied in certain other forms wthout departing from the spirit and essential characteristic thereof as defined by the scope of the appended claims.

I claim:

1. In a retractor mechanism for a load handling device, kinetic
   a longitudinal track structure having a shuttle unit mounted thereon for reciprocating movement therealong;
   fluid motor means supported on said track structure and connected to the shuttle unit;
   a shock absorber adapted to absorb the kinetic energy of said shuttle unit at the end of a power stroke prior to reversal of movement;
   a longitudinal slideway disposed internally of said track structure;
   a reciprocal slide assembly mounted on said slideway for movement therealong and supporting said shock absorber; said slide assembly having a portion provided with an internally threaded aperture;
   screw means extending through said threaded aperture of said slide member; said screw means being longitudinally stationarily retained within said track structure and extending outwardly thereof;
   actuator means attached to the outwardly extending portion of said screw means for rotation of said screw means;
   said shock absorber assembly being attached to and supported by said slide assembly such that upon rotation of said screw means by said actuator means said slide assembly will be moved along said slideway to cause longitudinal displacement of said shock absorber assembly along said track structure thereby adjustably limit the travel of said shuttle unit along said track structure under the control of said fluid motor and absorb the kinetic energy of said shuttle unit upon ceasing of power actuation of said fluid motor at a selected point along said track structure.

2. In combination with a retractor mechanism of a load handling device comprised of a longitudinal track structure having a shuttle unit mounted thereon for reciprocating movement therealong; said shuttle unit being power actuated for movement by fluid motor means supported on said track structure; and a shock absorber adapted to absorb the kenetic energy of said shuttle unit at the end of a power stroke prior to reversal of movement, the improvement comprising:
   a longitudinal slideway disposed internally of said track structure;

a reciprocable slide assembly mounted on said slideway for movement therealong and supporting said shock absorber;

said slide assembly having a portion provided with an internally threaded aperture;

screw means extending through said threaded aperture of said slide member;

said screw means being longitudinally stationarily retained within said track structure and extending outwardly thereof;

actuator means attached to the outwardly extending portion of said screw means for rotation of said screw means;

said shock absorber assembly being attached to and supported by said slide assembly such that upon rotation of said screw means by said actuator means said slide assembly will be moved along said slideway to cause longitudinal displacement of said shock absorber assembly along said track structure to thereby adjustably limit the travel of said shuttle unit along said track structure and absorb the kinetic energy of said shuttle unit upon ceasing of power actuation at a selected point along said track structure;

and a releasable lock nut on the screw means and operably engagable with said track structure for locking said screw means in rotatably adjusted position.

3. In the combination as defined in claim 2, in which said track structure comprises a longitudinal, normally open housing having a cover at one end; a bulk head disposed internally of said housing at a spaced distance from said cover; said screw means comprising an externally threaded rod rotatably supported in and between said cover and said bulk head; said releasable lock means comprising a nut and a lock washer associated therewith and threadedly engaging the outer end portion of said screw means; and a lever integral with said nut for rotation of said nut to release said lock washer.

4. In combination with a retractor mechanism of a load hadling device comprised of a longitudinal track structure having a shuttle unit mounted thereon for reciprocating movement therealong; said shuttle unit being power actuated for movement by fluid motor means supported on said track structure; and a shock absorber adapted to absorb the kinetic energy of said shuttle unit at the end of a power stroke prior to reversal of movement, the improvement comprising:

a longitudinal slideway disposed internally of said track structure;

a reciprocable slide assembly mounted on said slideway for movement therealong and supporting said shock absorber;

said slide assembly having a portion provided with an internally threaded aperture;

screw means extending through said threaded aperture of said slide member;

said screw means being longitudinally stationarily retained within said track structure and extending outwardly thereof;

actuator means attached to the outwardly extending portion of said screw means for rotation of said screw means;

said shock absorber assembly being attached to and supported by said slide assembly such that upon rotation of said screw means by said actuator means said slide assembly will be moved along said slideway to cause longitudinal displacement of said shock absorber assembly along said track structure to thereby adjustably limit the travel of said shuttle unit along said track structure and absorb the kinetic energy of said shuttle unit upon ceasing of power actuation at a selected point along said track structure;

and an adjusting screw on said slide assembly and operably connected to said shock absorber for axial longitudinal adjustment of said shock absorber relative to said supporting slide assembly.

* * * * *

UNITED STATES PATENT AND TRADEMARK OFFICE
CERTIFICATE OF CORRECTION

PATENT NO. : 3,742,774
DATED : July 3, 1973
INVENTOR(S) : Leland F. Blatt

It is certified that error appears in the above-identified patent and that said Letters Patent is hereby corrected as shown below:

Column 8, line 21, delete "kinetic".

Column 8, line 48, after "track structure" insert --to--.

Signed and Sealed this

Fifth Day of September, 1989

Attest:

DONALD J. QUIGG

Attesting Officer

Commissioner of Patents and Trademarks